United States Patent
Khati et al.

(10) Patent No.: US 12,549,629 B2
(45) Date of Patent: *Feb. 10, 2026

(54) CONTENT DELIVERY NETWORK DATA SHARING BETWEEN MOBILE DEVICES

(71) Applicant: Apple Inc., Cupertino, CA (US)

(72) Inventors: Dhruv Khati, San Jose, CA (US); Krishna Myneni, San Jose, CA (US); Shiva Krishna Narra, San Jose, CA (US); Sanjeevi Balasubramanian, San Jose, CA (US); Anjaneyulu Maganti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,170

(22) Filed: Sep. 27, 2023

(65) Prior Publication Data

US 2024/0022630 A1 Jan. 18, 2024

Related U.S. Application Data

(63) Continuation of application No. 17/731,067, filed on Apr. 27, 2022, now Pat. No. 11,805,169.

(Continued)

(51) Int. Cl.
*H04L 67/1087* (2022.01)
*H04L 67/04* (2022.01)
(Continued)

(52) U.S. Cl.
CPC .......... *H04L 67/1087* (2013.01); *H04L 67/04* (2013.01); *H04L 67/104* (2013.01); *H04W 4/20* (2013.01)

(58) Field of Classification Search
CPC ......... H04L 67/00; H04L 67/04; H04L 67/51; H04L 67/56; H04W 4/20; H04W 4/70
See application file for complete search history.

(56) References Cited

U.S. PATENT DOCUMENTS 9,140,776 B2  9/2015 Higgison et al.
10,813,031 B2 * 10/2020 Mendiola ................. H04B 7/15
(Continued)

FOREIGN PATENT DOCUMENTS

CA       3135076     10/2020
CN      103036973     4/2013
(Continued)

OTHER PUBLICATIONS

Notice of Reasons for Refusal Japanese Patent Application No. 2024-023885 Dec. 11, 2024 (Year: 2024).*
(Continued)

*Primary Examiner* — Boris D Grijalva Lobos
(74) *Attorney, Agent, or Firm* — FLETCHER YODER PC

(57) ABSTRACT

A mobile communication device is configured to receive updated network data, such as updated Content Delivery Network (CDN) data utilized to access a first network, without accessing the first network and a second network, such as a Wi-Fi or cellular network. The mobile communication device periodically transmits, via a peer-to-peer (P2P) network, a beacon signal indicating a network data request for the updated network data. A rate at which the mobile communication device periodically transmits the beacon signal is based on various criteria, such as an origination date of network data stored on the mobile communication device, an amount of time between the origination date and the present date, a battery health of the mobile communication device, and/or various inputs to the mobile communication device. An additional mobile communication device receives the beacon signal and transmits the updated network data to the mobile communication device.

14 Claims, 7 Drawing Sheets

Related U.S. Application Data

(60) Provisional application No. 63/245,070, filed on Sep. 16, 2021.

(51) Int. Cl.
  *H04L 67/104* (2022.01)
  *H04W 4/20* (2018.01)

(56) References Cited

U.S. PATENT DOCUMENTS

| | | | |
|---|---|---|---|
| 10,931,778 | B2 | 2/2021 | Paranjpe et al. |
| 10,972,893 | B1* | 4/2021 | Vangala .................. H04W 4/46 |
| 2008/0089299 | A1 | 4/2008 | Lindsley et al. |
| 2008/0162968 | A1* | 7/2008 | Breen ................... G01S 5/0294 713/323 |
| 2011/0163914 | A1 | 7/2011 | Seymour |
| 2014/0082213 | A1 | 3/2014 | Jung et al. |
| 2015/0078233 | A1 | 3/2015 | Singh |
| 2015/0264627 | A1 | 9/2015 | Perdomo |
| 2016/0037444 | A1 | 2/2016 | Jung et al. |
| 2016/0192344 | A1* | 6/2016 | Tiger .................... H04L 67/104 455/450 |
| 2016/0269486 | A1* | 9/2016 | Gupta ..................... H04L 67/12 |
| 2016/0366055 | A1 | 12/2016 | Leach |
| 2017/0078965 | A1* | 3/2017 | Chen ................... H04W 12/041 |
| 2017/0180470 | A1 | 6/2017 | Zhang |
| 2018/0049100 | A1 | 2/2018 | Tenny et al. |
| 2018/0373733 | A1 | 12/2018 | Andrew et al. |
| 2019/0058522 | A1* | 2/2019 | Haley ..................... G06F 16/23 |
| 2020/0015169 | A1 | 1/2020 | Maganti et al. |
| 2021/0029075 | A1 | 1/2021 | Yu |
| 2021/0084609 | A1 | 3/2021 | Zisimopoulos et al. |
| 2022/0094723 | A1 | 3/2022 | Nooren et al. |
| 2022/0196784 | A1 | 6/2022 | Wirola et al. |

FOREIGN PATENT DOCUMENTS

| | | | |
|---|---|---|---|
| CN | 104025016 A | 9/2014 | |
| CN | 111527730 A | 8/2020 | |
| EP | 2764432 A2 | 8/2014 | |
| JP | 2013046108 | 3/2013 | |
| KR | 10-2011-0099100 A | 9/2011 | |
| WO | 2019125037 | 6/2019 | |
| WO | WO-2019125037 A1 * | 6/2019 | ............... H04B 7/06 |

OTHER PUBLICATIONS

Translation for CN103036973A (cited on IDS filed on Sep. 27, 2023) (Year: 2013).*

F. V. Hecht, T. Bocek, C. Morariu, D. Hausheer and B. Stiller, "LiveShift: Peer-to-Peer Live Streaming with Distributed Time-Shifting," 2008 Eighth International Conference on Peer-to-Peer Computing, 2008, pp. 187-188, doi: 10.1109/P2P.2008.49.

C. Hammami, I. Jemili, A. Gazdar, A. Belghith, M. Mosbah, "Hybrid Live P2P Streaming Protocol," 5th International Conference on Ambient Systems, Networks, and Technologies (ANT-2014), Procedia Computer Science 32 (2014), pp. 158-165, doi: 10.1016.

Zahn et al.; "Feasibility of content dissemination between devices in moving vehicles"; Conext '09 Proceeding of the 5th International conference on Emerging Networking Experiments and Technologies; Dec. 1-4, 2009, Association for Computing Machinery; Dec. 1, 2009, pp. 97-108 (XP058093207).

Kayhan et al.; "A fuzzy logic approach to beaconing for vehicular ad hoc networks"; Telecommunication Systems, vol. 52, No. 1, Jan. 1, 2013; pp. 139-149 (XP055977606).

Extended European Search Report for European Patent Application No. 22178752.6 dated Nov. 11, 2022; 13 pgs.

* cited by examiner

CONTENT DELIVERY NETWORK DATA SHARING BETWEEN MOBILE DEVICES

CROSS-REFERENCE TO RELATED APPLICATIONS

This application is a continuation of U.S. application Ser. No. 17/731,067, entitled "CONTENT DELIVERY NETWORK DATA SHARING BETWEEN MOBILE DEVICES," filed Apr. 27, 2022, which claims priority to U.S. Provisional Application No. 63/245,070, filed Sep. 16, 2021, entitled, "CONTENT DELIVERY NETWORK DATA SHARING BETWEEN MOBILE DEVICES," which are hereby incorporated by reference in their entireties for all purposes.

BACKGROUND

The present disclosure relates generally to data sharing between mobile communication devices. More specifically, the present disclosure relates to Content Delivery Network (CDN) data sharing between mobile communication devices.

A mobile communication device may utilize different networks, such as cellular networks, Wi-Fi networks, terrestrial and non-terrestrial (e.g., satellite) networks, and the like, to transmit and/or receive data. In certain situations, the mobile communication device receives network data, such as Content Delivery Network (CDN) data, containing information that enables the mobile communication device to access a first network, such as a cellular network or a satellite network. For example, the network data may include projected characteristics of the first network over time, such as projected network node locations over time, projected frequency channels utilized by the first network over time, and the like. Unfortunately, deviations of the actual characteristics of the first network from the projected characteristics may increase as time goes on if the network data is not refreshed periodically. Thus, the network data and corresponding projected characteristics of the first network may become unreliable. Additionally or alternatively, the network data received by the mobile communication device may include projected characteristics of the first network for a finite period of time, such as two weeks. Thus, the network data and corresponding projected characteristics of the first network expires after the finite period of time lapses, even if they are reliable for the duration of the finite period of time.

SUMMARY

In one embodiment, a mobile communication device includes a transmitter, a memory configured to store first Content Delivery Network (CDN) data, and processing circuitry communicatively coupled to the memory and the transmitter and configured to cause the transmitter to transmit, over a peer-to-peer (P2P) network, a beacon signal indicating a CDN sharing request for second CDN data.

In another embodiment, a mobile communication device includes a transceiver, a memory configured to store Content Delivery Network (CDN) data, and processing circuitry communicatively coupled to the memory and the transceiver and configured to cause the transceiver to receive, from an additional mobile communication device and over a peer-to-peer (P2P) network, a beacon signal indicating a CDN sharing request for the CDN data. The processing circuitry is also configured to cause the transceiver to transmit, over the P2P network, the CDN data to the additional mobile communication device.

In yet another embodiment, a non-transitory, computer readable medium includes instructions thereon that, when executed by one or more processors, are configured to cause the one or more processors to transmit, via a transmitter of a mobile communication device and over a peer-to-peer (P2P) network, a beacon signal indicating a Content Delivery Network (CDN) data sharing request for CDN data when the mobile communication device is without access to a Wi-Fi network and cellular network. The instructions, when executed by the one or more processors, are also configured to cause the one or more processors to receive, via a receiver of the mobile communication device and over the P2P network, the CDN data from an additional mobile communication device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
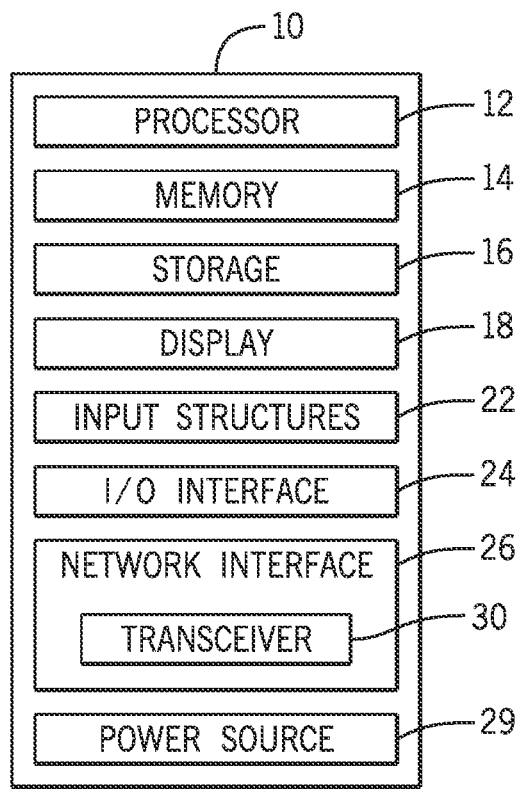
FIG. 1 is a block diagram of an electronic device, according to embodiments of the present disclosure.

This disclosure is directed to sharing network data, such as Content Delivery Network (CDN) data, between mobile communication devices via a peer-to-peer (P2P) network. For example, a mobile communication device may utilize various networks to transmit and/or receive data. The mobile communication device may access a first network (e.g., a non-terrestrial network, a satellite network) via network data, such as CDN data, that includes projected characteristics of the first network. The projected characteristics of the first network may include projected network node locations of the first network for given points in time, projected frequency channels utilized by the first network for given points in time, and the like. However, actual characteristics of the first network may deviate from the projected characteristics. Further, the deviations of the actual characteristics of the first network from the projected characteristics may increase in extent as time goes on. Accordingly, the projected characteristics may become unreliable and the mobile communication device may be unable to access the first network.

Further, each instance of the network data received by the mobile communication device may include projected characteristics of the first network for a finite period of time, such as two weeks. Accordingly, even if the network data is adequately reliable over the finite period of time, the network data may eventually expire. In general, the mobile communication device periodically downloads updated network data from a data source while the mobile communication device is connected to a second network, such as a Wi-Fi or cellular network, different than the first network. Indeed, the network data corresponding to the first network may be too large to download via the first network, the first network may be periodically inaccessible due to incompatible locations of the network nodes of the first network relative to the mobile communication device, and/or the first network may only be accessed by the mobile communication device during emergency scenarios.

In accordance with present embodiments, the mobile communication device may include features configured to enable the mobile communication device to receive the network data without being connected to a central server, such as in the case of the second network (e.g., Wi-Fi or cellular network). Such may be the case when the mobile communication device is disposed in a remote location that does not provide access to the second network. For example, the mobile communication device may be equipped with componentry and control logic that enable the mobile communication device to receive the network data from an additional mobile communication device via a third network, such as a P2P network, different than the first network and the second network. The mobile communication device may periodically transmit, via the P2P network, a beacon signal indicating a network data sharing request for updated network data (e.g., CDN data). Based on various criteria, the mobile communication device may determine how often to transmit the beacon signal. The criteria may include, for example, an origination date of the network data stored on the mobile communication device, an amount of time between the origination date and the present date, a battery health of the mobile communication device, whether the mobile communication device has received an input indicative of an emergency situation (e.g., associated with a user of the mobile communication device), and other criteria described in detail below. In some embodiments, the mobile communication device may include features that enable the mobile communication device to locate areas expected to have a relatively high density of additional mobile communication devices, in order to increase a likelihood that the mobile communication device receives updated network data from one of the additional mobile communication devices via the P2P network.

In accordance with present embodiments, the mobile communication device may also include features that enable the mobile communication device to transmit the network data to an additional mobile communication device requesting the network data. For example, the mobile communication device may receive from the additional mobile communication device a beacon signal indicating a network data sharing request for network data. The mobile communication device may present to the user of the mobile communication device an option to approve transmittal of the network data residing on the mobile communication device to the additional mobile communication device. In some embodiments, the mobile communication device may first determine that additional network data residing on the additional mobile communication device is older than the network data residing on the mobile communication device, and then present the option to approve transmittal of the network data residing on the mobile communication device to the additional mobile communication device. Further, in certain situations, the mobile communication device may automatically transmit the network data to the additional mobile communication device in response to the mobile communication device receiving the beacon signal, such as when the user pre-approves network data transmittal prior to the mobile communication device receiving the beacon signal.

Embodiments herein provide various apparatuses and techniques to enable the mobile communication device to receive reliable network data, such as CDN data, from another mobile communication device when the mobile communication device is unable to receive the network data via another means (e.g., from another data source via a Wi-Fi network connection or a cellular network connection). Further, embodiments herein provide various apparatuses and techniques to enable the mobile communication device to send reliable network data, such as CDN data, to another mobile communication device requesting CDN data. These and other features are described in detail below with reference to the drawings.

With the foregoing in mind, FIG. 1 is a block diagram of an electronic device or mobile communication device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a terrestrial (e.g., land-based) network or non-terrestrial network (NTN), a peer-to-peer connection, a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, and so on. The network interface 26 can further communicate via NTNs, or segments of such networks, using an airborne or spaceborne vehicle (e.g., satellite) for transmission. As used herein, airborne vehicles refer to High Altitude Platforms (HAPs) encompassing satellites, Unmanned Aircraft Systems (UAS)—including tethered UAS, Lighter than Air UAS and Heaver than Air UAS—operating at altitude; typically between 8 and 50 kilometers, quasi stationary. In particular, the network interface 26 may include, for example, one or more interfaces for using a cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating data using one of the aforementioned networks. The power source 29 of the electronic device 10 may include any suitable source of power, such as a rechargeable lithium polymer (Li-poly) battery and/or an alternating current (AC) power converter.

Figure 2:
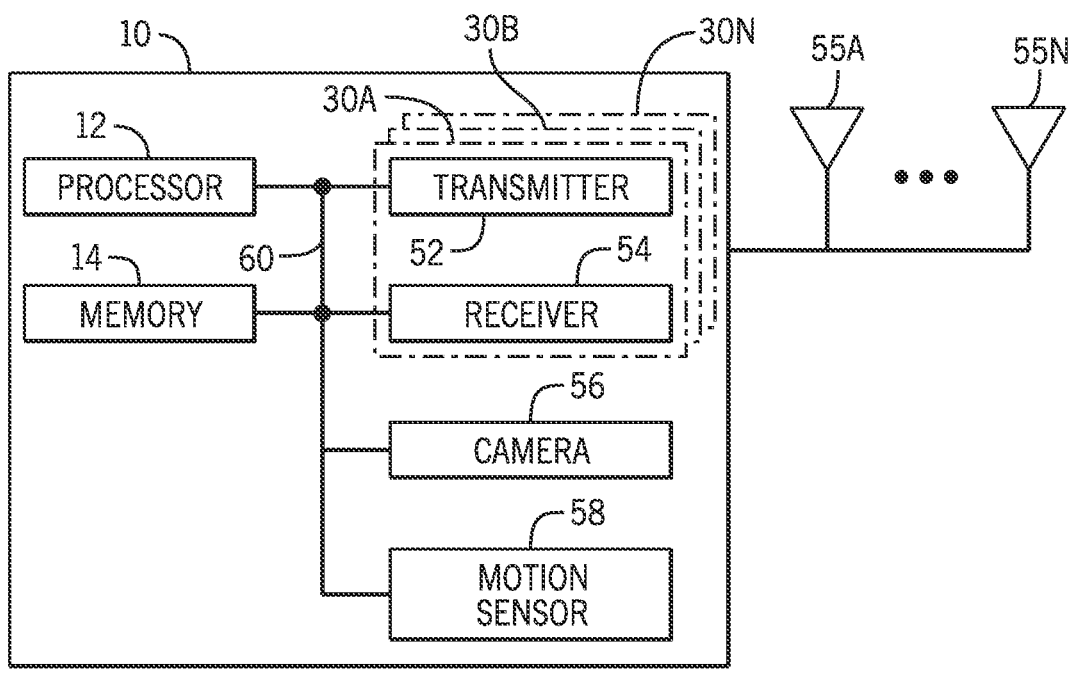
FIG. 2 is a functional diagram of the electronic device of FIG. 1, according to embodiments of the present disclosure.

FIG. 2 is a functional diagram of the electronic device 10 or mobile communication device of FIG. 1, according to embodiments of the present disclosure. As illustrated, the processor 12, the memory 14, the transceiver 30 (illustrated as 30A-30N, collectively referred to as a transceiver 30), a transmitter 52 of the transceiver 30, a receiver 54 of the transceiver 30, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers (e.g., transceivers 30A-30N), and/or multiple antennas as suitable for various communication standards. For example, the electronic device 10 may include a first transceiver 30A to send and receive messages using a first wireless communication (e.g., satellite or non-terrestrial) network, a second transceiver 30B to send and receive messages using a second wireless communication (e.g., Wi-Fi or cellular) network, and a third transceiver 30N to send and receive messages using a third wireless communication (e.g., P2P) network, though any or all of these transceivers may be combined in a single transceiver. In some embodiments, the transmitter 52 and the receiver 54 may transmit and receive information via other wired or wireline systems or means.

The electronic device 10 may also include one or more cameras or image or light sensors (e.g., as part of the input structures 22). The one or more cameras or image or light sensors (collectively referred to as a "camera 56" herein) may capture images or determine amounts of light surrounding the electronic device 10. In some embodiments, the camera 56 may include a front-facing camera (e.g., disposed on a display surface of the electronic device 10 having the display 18) and/or a rear-facing camera (e.g., disposed on a base or back surface, opposite the display surface, of the electronic device 10).

The electronic device 10 may include one or more motion sensors 58 (e.g., as part of the input structures 22). The one or more motion sensors (collectively referred to as a "motion sensor 58" herein) may include an accelerometer, gyroscope, gyrometer, and the like, that detects or facilitates determining an orientation (e.g., including pitch, yaw, roll, and so on) and/or motion of the electronic device 10.

As illustrated, the various components of the electronic device 10 may be coupled together by a bus system 60. The bus system 60 may include a data bus, for example, as well as a power bus, a control signal bus, and a status signal bus, in addition to the data bus. The components of the electronic device 10 may be coupled together or accept or provide inputs to each other using some other mechanism.

As previously described, and in accordance with the present disclosure, the electronic device 10 may access various networks to transmit and/or receive data. For example, the electronic device 10 may access a Wi-Fi or cellular network to transmit and/or receive data. In certain conditions, the electronic device 10 may be unable to access the Wi-Fi network and the cellular network. Thus, the electronic device 10 may access a different network, such as a satellite network or non-terrestrial network, when the electronic device 10 is unable to access the Wi-Fi network and the cellular network. For example, the electronic device 10 may receive and utilize network data, such as Content Delivery Network (CDN) data, to access the satellite network or non-terrestrial network.

The network data may include projected characteristics of the satellite or non-terrestrial network over time, such as network node (e.g., satellite, HAP) locations of the satellite or non-terrestrial network for given points in time, frequency channels of the satellite or non-terrestrial network for given points in time, and the like. The projected characteristics may deviate from actual characteristics of the satellite or non-terrestrial network as time goes on. Further, the network data including information relating to the projected characteristics may eventually expire. Thus, as the network data becomes unreliable and/or approaches expiration, the electronic device 10 may download updated network data. In instances where the electronic device 10 is unable to access Wi-Fi networks, cellular networks, the satellite network, and the non-terrestrial network to download updated network data relating to the satellite or non-terrestrial network, the electronic device 10 in accordance with the present disclosure may request updated network data from an additional electronic device via a peer-to-peer network between the electronic device 10 and the additional electronic device. It should be understood that a peer-to-peer or device-to-device network may include a network of interconnected nodes or "peers" (e.g. including the electronic device 10 and the additional electronic device) that share resources amongst each other without use of a centralized administrative system. As such, the peer-to-peer network may operate without a central server.

Figure 3:
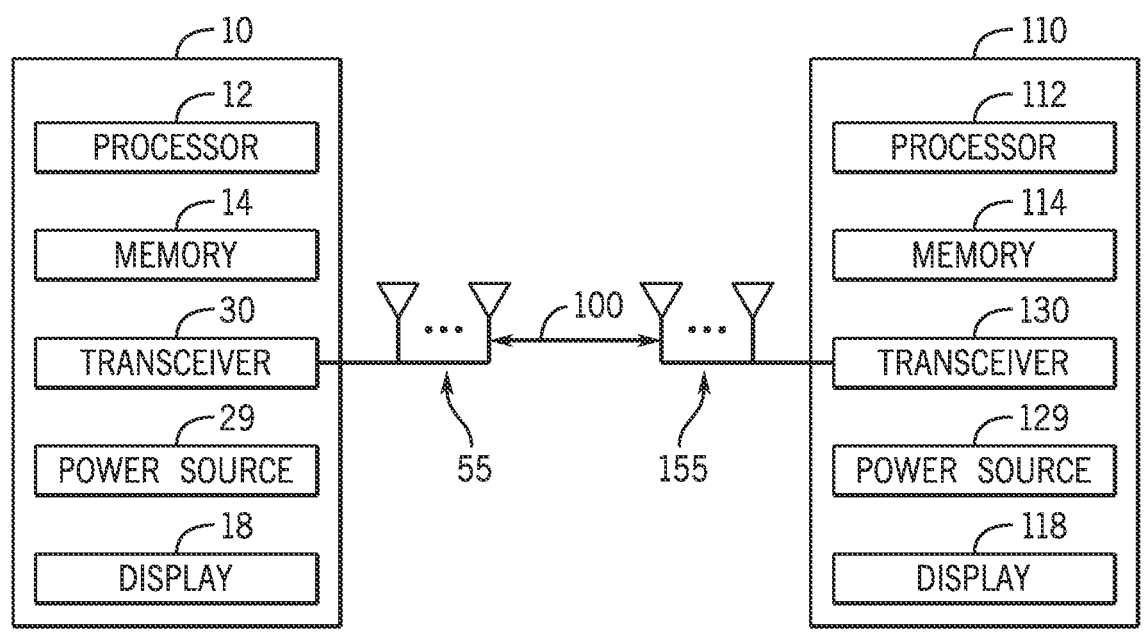
FIG. 3 is a block diagram illustrating a communicative coupling between the electronic device of FIG. 1 and an additional electronic device via a peer-to-peer (P2P) network, according to embodiments of the present disclosure.

With the foregoing in mind, FIG. 3 is a block diagram illustrating an embodiment of a communicative coupling 100 between the electronic device 10 of FIG. 1 and an additional electronic device 110 via a peer-to-peer (P2P) network. The communicative coupling 100 in the illustrated embodiment is a P2P communicative coupling. It should be noted that the electronic device 10 and the additional electronic device 110 illustrated in FIG. 3 are simplified relative to the electronic device 10 illustrated in FIGS. 1 and 2, but that the electronic device 10 and the additional electronic device 110 in FIG. 3 may include the same or similar features as those presented in FIGS. 1 and 2. For example, the additional electronic device 110 includes an additional processor 112, an additional memory 114, an additional display 118, an additional power source 129, an additional transceiver 130, and one or more additional antennas 155. Further, the electronic device 10 is referred to below as the first mobile communication device 10, and the additional electronic device 110 is referred to below as the second mobile communication device 110.

As previously described, in certain circumstances, the first mobile communication device 10 may be unable to access certain networks, such as a Wi-Fi network and/or a cellular network. As an alternate to Wi-Fi and cellular networks, the first mobile communication device 10 may attempt to access a different network, such as a satellite or non-terrestrial network. Access to the satellite or non-terrestrial network, for example, may be contingent upon the first mobile communication device 10 utilizing network data stored thereon, such as CDN data, including projected characteristics of the satellite network or non-terrestrial (e.g., network node locations at given points in time, frequency channels at given points of time, and the like). For example, the CDN data may include ephemeris data (e.g., a set of parameters that enables an accurate determination of a network node location or a projected network node location at a specific time, including a current time or a future time). If the network data is unreliable due to deviations between actual characteristics of the satellite or non-terrestrial network and projected characteristics, or if the network data is expired, the first mobile communication device 10 may be unable to access the satellite or non-terrestrial network.

Further, in certain circumstances, the first mobile communication device 10 may be unable to access the satellite or non-terrestrial network (or otherwise unable to receive the network data via access to the satellite or non-terrestrial network) even if the network data is reliable and unexpired. For example, the network node locations may be periodically incompatible with a location of the first mobile communication device 10, or a file size containing the network data may be too large to transmit to the first mobile communication device 10 via the satellite network. In accordance with present embodiments, the first mobile communication device 10 may utilize the P2P communicative coupling 100 between the first mobile communication device 10 and the second mobile communication device 110 in an attempt to receive updated network data from the second mobile communication device 110.

For example, the first mobile communication device 10 may determine that the network data stored on the first mobile communication device 10 (e.g., stored on the memory 14, the storage 16, or a separate storage location) is expired, relatively old, or otherwise unreliable or approaching unreliability. The processor 12 of the first mobile communication device 10 may initiate a beacon transmitted via the transceiver 30 and corresponding antenna(s) 55 of the first mobile communication device 10, the beacon corresponding to a network data sharing request for updated network data from the second mobile communication device 110. The P2P communicative coupling 100 between the first mobile communication device 10 and the second mobile communication device 110 may be established when the mobile communication devices 10, 110 are within a sufficient proximity of one another, in response to the beacon initiated by the processor 12 of the first mobile communication device 10, or a combination thereof.

The second mobile communication device 110 receives the beacon from the first mobile communication device 10 via the P2P communicative coupling 100. In some embodiments, the second mobile communication device 110 presents, on the display 118 thereof, data indicative of the beacon. A user of the second mobile communication device 110 may approve transmission of network data stored on the second mobile communication device 110 (e.g., stored in the memory 114 or another storage location) to the first mobile communication device 10. In some embodiments, the beacon includes data indicative of an origination date of the network data stored on the first mobile communication device 10. In such embodiments, the second mobile communication device 110 may first determine that the network data stored on the second mobile communication device 110 is more recent than the network data stored on the first mobile communication device 10, and then present on the display 118 of the second mobile communication device 110 the option to transmit or share the network data via the P2P communicative coupling 100. The second mobile communication device 110 transmits the network data to the first mobile communication device 10 in response to a selection of the option to transmit or share the network data.

As described above, the P2P communicative coupling 100 may be established when the first mobile communication device 10 and the second mobile communication device 110 are within a sufficient proximity of one another via, for example, a beacon from the first mobile communication device 10. Further, transmission of the updated network data from the second mobile communication device 110 to the first mobile communication device 10 may be contingent on a user of the second mobile communication device 110 approving transmission. For these reasons, among others, the first mobile communication device 10 may send multiple beacon signals until receiving the updated network data. A frequency or rate at which the first mobile communication device 10 transmits the beacon signals may be based on various criteria, including an origination date of the network data residing on the mobile communication device, an amount of time between the origination date and the present date, a battery health of the mobile communication device, whether the mobile communication device has received an input indicative of an emergency situation (e.g., associated with a user of the mobile communication device), and the like. These and other features are described in detail below with reference to later drawings.

Figure 4:
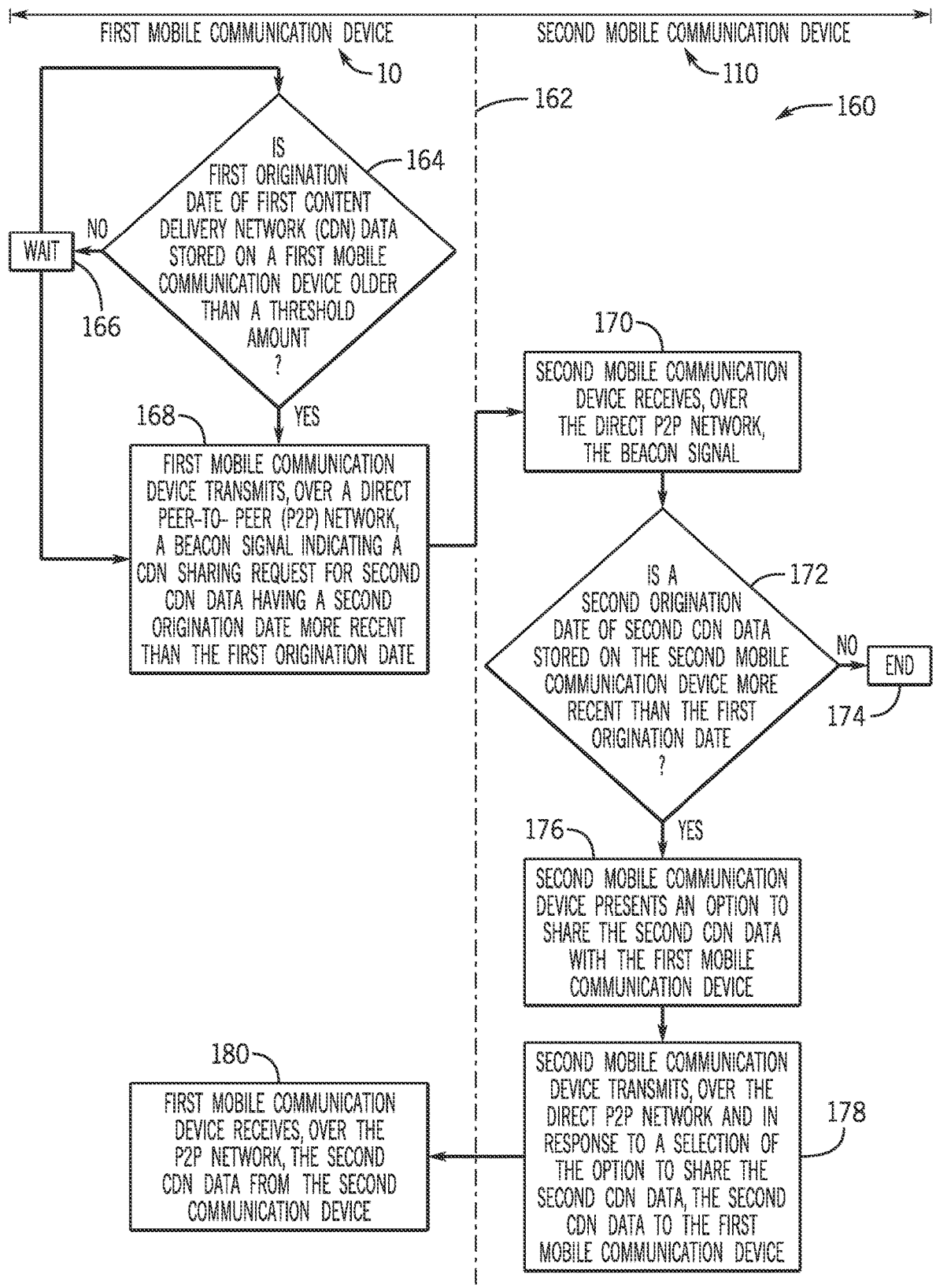
FIG. 4 is a process flow diagram of a method of sharing network data, such as Content Delivery Network (CDN) data, between the electronic device of FIG. 1 and an additional electronic device, according to embodiments of the present disclosure.

FIG. 4 is a process flow diagram of a method 160 of sharing network data, such as Content Delivery Network (CDN) data, between the electronic device 10 of FIG. 1 (referred to below as the first mobile communication device 10) and the additional electronic device 110 (referred to below as the second mobile communication device 110). In the illustrated embodiment, the method 160 is segmented (e.g., via line 162) between actions taken by the first mobile communication device 10 and actions taken by the second mobile communication device 110. At block 164, the first mobile communication device 10 determines whether a first origination date of first CDN data stored on the first mobile communication device 10 is older than a threshold amount of time. Put differently, the first mobile communication device 10 determines whether a difference between the present date and the first origination date is greater than the threshold amount of time. The threshold amount may be based upon a likelihood of network data older than the threshold amount of time being unreliable and/or expired. As an example, the threshold amount of time may be one day, two days, three days, four days, five days, six days, or any number of days up to fourteen days (or, in some embodiments, more).

If the first origination date of the network data stored on the first mobile communication device 10 is not older than the threshold amount of time, then the method 160 may return to block 164. In some embodiments, the method 160 includes, at block 166, waiting a duration of time before returning to block 164, or waiting until the first origination date is older than the threshold amount of time, and then continuing to block 168.

At block 168, the first mobile communication device 10 transmits, over a P2P network, a beacon signal indicating a network data sharing request for second network data (e.g., CDN data) having a second origination date more recent than the first origination date. As will be appreciated in view of later drawings and description thereof, the first mobile communication device 10 transmits multiple beacon signals at a rate or frequency determined by the first mobile communication device 10 based on various criteria, such as an age of the first origination date, a battery health of the first mobile communication device 10, whether the first mobile communication device 10 has received an input indicative of an emergency situation (e.g., indicating that a user of the first mobile communication device 10 is lost or injured), and the like.

At block 170, the second mobile communication device 110 receives, via the P2P network, the beacon signal from the first mobile communication device 10. As previously described, the P2P communicative coupling 100 illustrated in FIG. 3 is established when the first mobile communication device 10 and the second mobile communication device 110 are within sufficient proximity of one another. The P2P network may include, for example, a Bluetooth network, a Bluetooth Low Energy ("Bluetooth LE") network, a P2P Wi-Fi network, a Near-Field Communication network, or the like. It should be noted that multiple instances of the second mobile communication device 110 may receive the beacon signal from the first mobile communication device 10, thereby increasing a likelihood that one or more of the second mobile communication devices 110 transmits updated network data to the first mobile communication device 10.

At block 172, the second mobile communication device 110 determines whether a second origination date of network data (e.g., CDN data) stored on the second mobile communication device 110 is more recent than the first origination date of the network data (e.g., CDN data) stored on the first mobile communication device 10. For example, in some embodiments, the beacon signal transmitted by the first mobile communication device 10 to the second mobile communication device 110 includes data indicative of the first origination date, and the second mobile communication device 110 compares the first origination date with the second origination date associated with the network data stored on the second mobile communication device 110. If the second origination date is not more recent than the first origination date, then action by the second mobile communication device 110 is ended at block 174.

If the second mobile communication device 110 determines that the second origination date is more recent than the first origination date, the method 160 continues to block 176. However, in some embodiments, the beacon signal received by the second mobile communication device 110 does not include data indicative of the first origination date associated with the first mobile communication device 10, in which case the method 160 proceeds directly from block 170 to block 176. At block 176, the second mobile communication device 110 presents an option (e.g., to the display 118 of the second mobile communication device 110) to share the second network data (e.g., second CDN data) with the first mobile communication device 10. A user of the second mobile communication device 110 may elect to share or not share the second network data with the first mobile communication device 10. In some embodiments, the second mobile communication device 110 may be configured by the user or defaulted to share or not share the second network data with other mobile communication devices (e.g., including the first mobile communication device 10).

At block 178, the second mobile communication device 110 transmits, via the P2P network and in response to the selection of the option to share the second network data, the second network data to the first mobile communication device 10. At block 180, the first mobile communication device 10 receives the second network data from the second mobile communication device 110. The first mobile communication device 10 downloads the second network data and utilizes the second network data to access the network (e.g., satellite or non-terrestrial network) associated with the second (or updated) network data received from the second mobile communication device 110.

As previously described, the first mobile communication device 10 continues to transmit beacon signals (e.g., at block 168) until the beacon signal is received and acknowledged by an instance of the second mobile communication device 110. A reliability of the network data stored on the first mobile communication device 10 (i.e., prior to receiving updated network data) may decrease over time and ultimately expire. Accordingly, a need for updated network data (e.g., CDN data) may increase as time goes on. Further, transmitting beacon signals over the P2P network for updated network data may tend to deplete a battery life of the power source 29 of the first mobile communication device 10. Accordingly, as described in detail below, the first mobile communication device 10 may consider various criteria (e.g., an age of the network data stored on the first mobile communication device 10, a battery life of the power source 29 of the first mobile communication device 10, etc.) to determine a rate or frequency (e.g., how often) to transmit the beacon signal until the beacon signal is answered.

Figure 5:
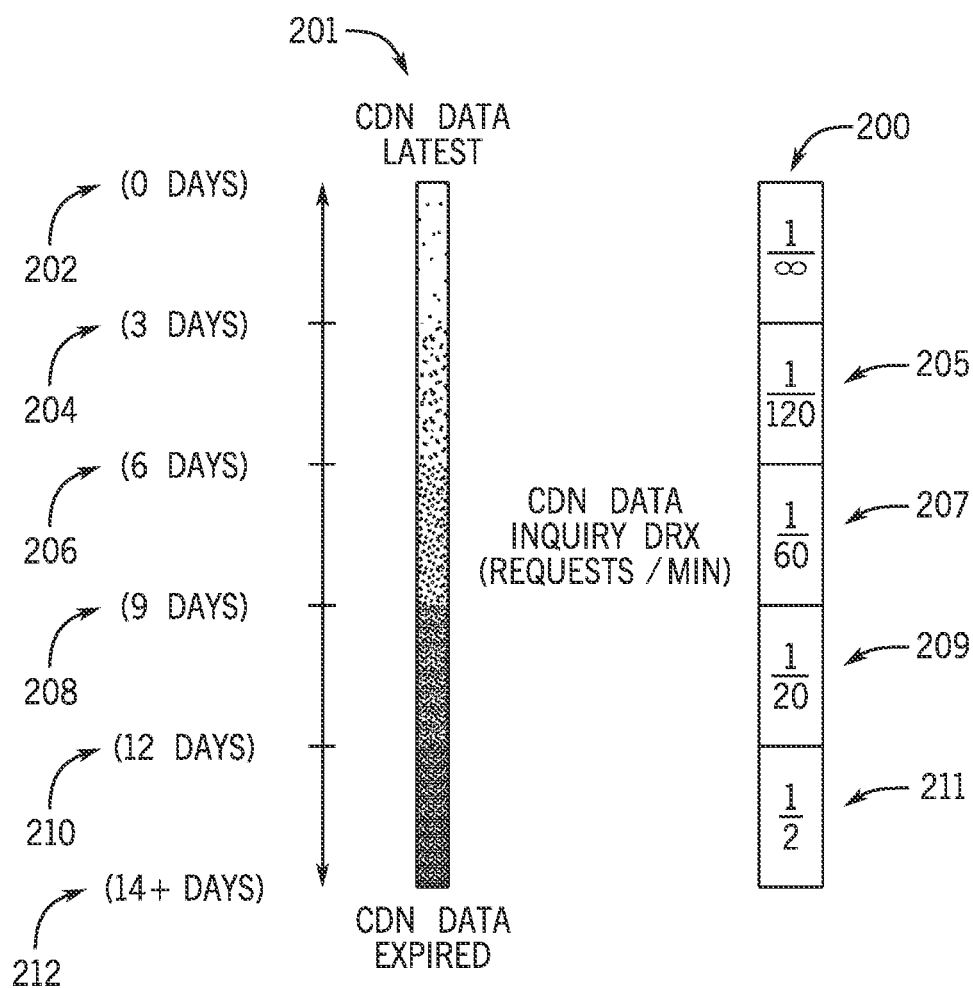
FIG. 5 is a schematic diagram illustrating time-based criteria by which the electronic device of FIG. 1 determines a frequency or rate for requesting network data from an additional electronic device, according to embodiments of the present disclosure.

FIG. 5 is a schematic diagram illustrating an embodiment of time-dependent criteria by which the first mobile communication device 10 determines a frequency or rate 200 for requesting updated network data from the second mobile communication device 110. The rate 200 may include, for example, a number of beacon signals transmitted by the mobile communication device 10 per minute, where the rate 200 is dependent on an age 201 of the network data stored on the mobile communication device 10 (e.g., a number of days that have lapsed since the origination date of the network data). In the illustrated embodiment, the rate 200 includes a first rate 205 of one beacon signal per 120 minutes if the age 201 of the network data is between three days 204 and six days 206. The rate 200 includes a second rate 207 of one beacon signal per 60 minutes if the age 201 is between six days 206 and nine days 208. The rate 200 includes a third rate 209 of one beacon signal per 20 minutes if the age 201 is between nine days 208 and twelve days 210. The rate 200 includes a fourth rate 211 of one beacon signal every two minutes if the age 201 is between 12 days 210 and 14 days 212. As previously described, the rate 200 determined by the mobile communication device 10 for how often to send the beacon signal may be employed at block 168 in the method 160 illustrated in FIG. 4 (e.g., until the beacon signal is answered as illustrated in blocks 178 and 180 of FIG. 4). It should be noted that FIG. 5 is merely provided as an example and that the control logic for determining the rate 200 of beacon signal transmission based upon the age 201 of the network data stored on the mobile communication device 10 may differ.

Figure 6:
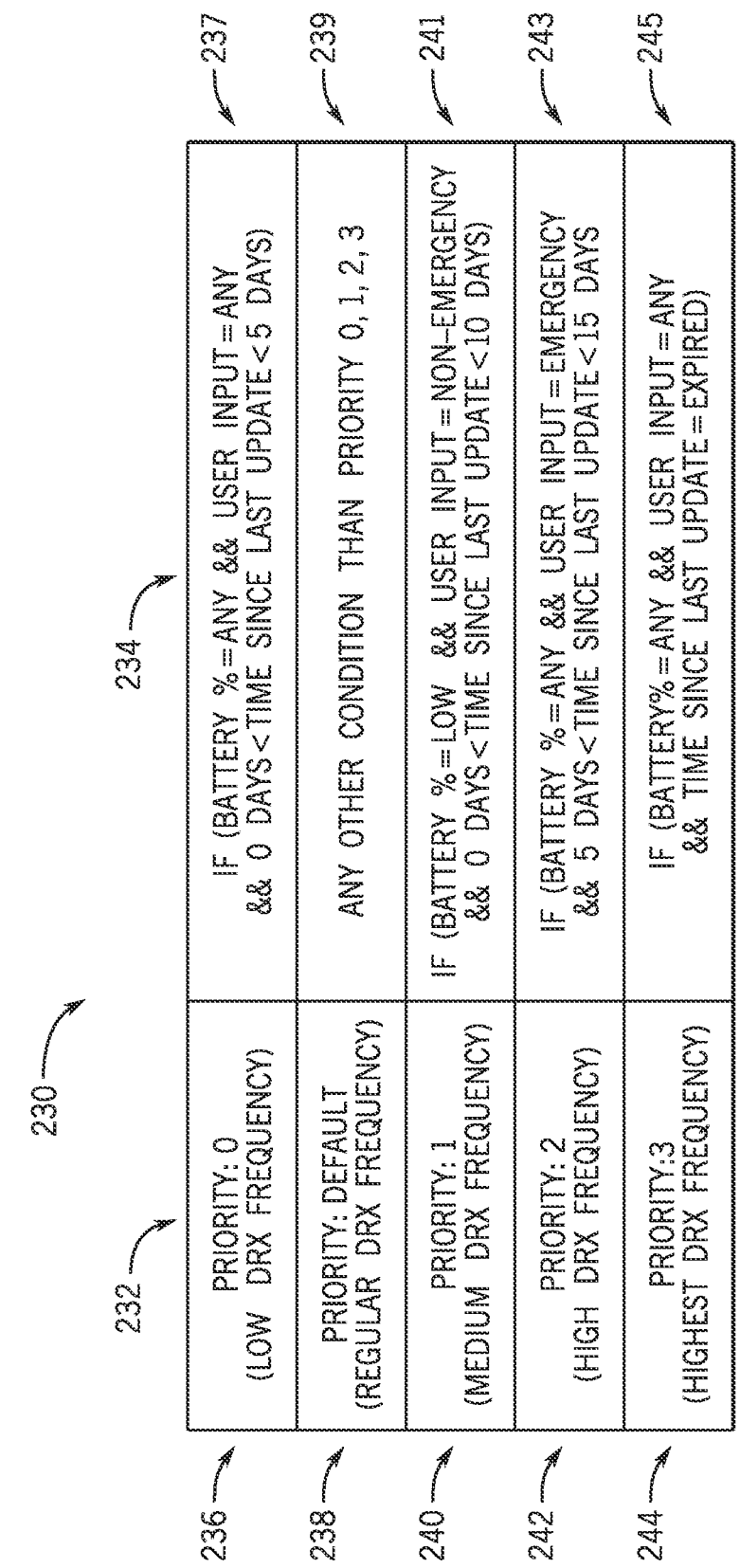
FIG. 6 is a schematic diagram illustrating a table of priority indexes by which the electronic device of FIG. 1 determines a frequency or rate for requesting network data from an additional electronic device, according to embodiments of the present disclosure.
Figure 7:
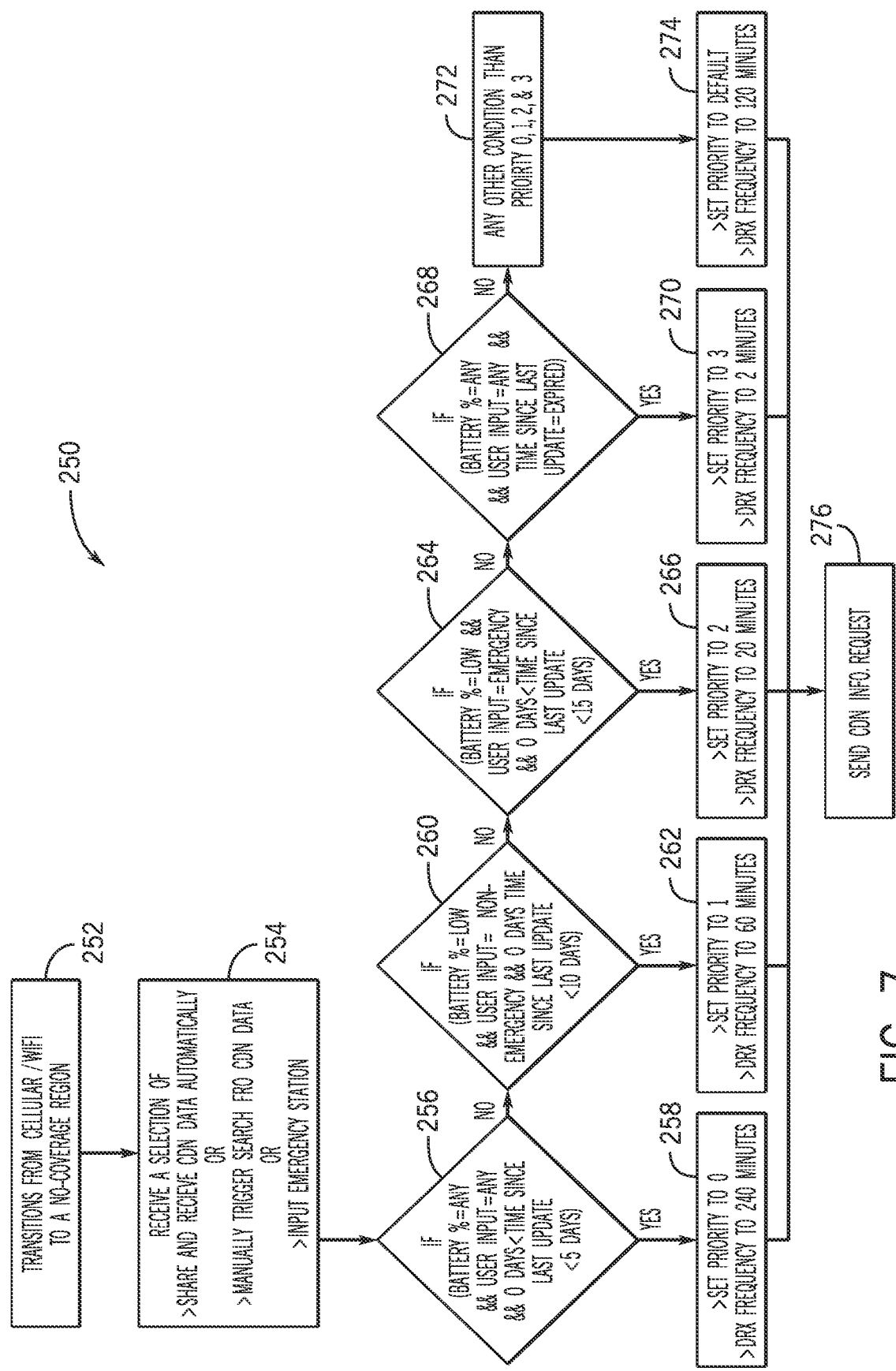
FIG. 7 is a process flow diagram of a method of sharing network data between the electronic device of FIG. 1 and an additional electronic device based on the table of priority indexes in FIG. 6, according to embodiments of the present disclosure.

Other techniques by which the mobile communication device 10 determines a rate for requesting network data, such as CDN data, are also possible. Indeed, criteria other than the age 201 of the network data stored on the mobile communication device 10 may be considered by the mobile communication device 10 in determining the rate for sending beacon signals indicating a network sharing request for updated network data. For example, FIG. 6 is a schematic diagram illustrating a table 230 of priority indexes by which the electronic device 10 of FIG. 1 (referred to below as the mobile communication device 10) determines a rate for requesting network data from the additional mobile communication device 110. FIG. 7, described in detail below after description of FIG. 6, is a process flow diagram of a method 250 of sharing network data, such as CDN data, between the mobile communication device 10 and the additional mobile communication device 110 based on the table 230 of priority indexes in FIG. 6.

In FIG. 6, the table 230 includes a priority index column 232 and a criteria column 234. The priority index column 232 includes a zero priority index 236, a default priority index 238, a first priority index 240, a second priority index 242, and a third priority index 244. The zero priority index 236 corresponds to a zero criteria set 237 in the criteria column 234, the default priority index 238 corresponds to a default criteria set 239 in the criteria column 234, the first priority index 240 corresponds to a first criteria set 241 in the criteria column 234, the second priority index 242 corresponds to a second criteria set 243 in the criteria column 234, and the third priority index 244 corresponds to a third criteria set 245 in the criteria column 234.

The zero criteria set 237 corresponding to the zero priority index 236 is met if the age of the network data (e.g., CDN data) on the mobile communication device 10 is between zero days and five days. That is, the zero criteria set 237 is met regardless of the battery health (e.g., state of charge percentage) of the mobile communication device 10, and regardless of any user inputs to the mobile communication device 10 associated with network data requests. The default criteria set 239 corresponding to the default priority index 238 is met if none of the other criteria sets 237, 241, 243, 245 are met.

The first criteria set 241 corresponding to the first priority index 240 is met if the battery health (e.g., state of charge percentage) of the mobile communication device 10 is low (e.g., below a first battery health threshold), no emergency situation input has been entered to the mobile communication device 10 (or a non-emergency input has been entered), and the age of the network data stored on the mobile communication device 10 is between zero days and 10 days. The first battery health threshold may be, for example, 10% state of charge, 20% state of charge, or 30% state of charge. The second criteria set 243 corresponding to the second priority index 242 is met if an emergency situation input has been entered to the mobile communication device 10 and the age of the network data stored on the mobile communication device 10 is between five and 15 days. Thus, the second criteria set 243 does not include a battery health (e.g., state of charge percentage) of the mobile communication device 10. The third criteria set 245 corresponding to the third priority index 244 is met if the network data stored on the mobile communication device is expired (or if no network data is stored on the mobile communication device 10).

It should be noted that FIG. 6 is provided merely as an example of how the mobile communication device 10 may consider various criteria (e.g., age of network data stored on the mobile communication device 10, whether an emergency situation exists, battery health of the mobile communication device 10), and that other control logic may be employed, including differences in how the various criteria are distributed to various priority indexes. Further, it should be noted that certain of the above-described criteria sets 237, 239, 241, 243, 245 may include overlapping parameters, and that a state of the mobile communication device 10 may meet multiple of the criteria sets 237, 239, 241, 243, 245. However, as will be appreciated in view of the description below, the mobile communication device 10 may consider the criteria sets 237, 239, 241, 243, 245 in an ordered series. Thus, once one of the criteria sets 237, 239, 241, 243, 245 is met, the mobile communication device 10 may select the corresponding priority index 236, 238, 240, 242, 244 and not consider the remaining criteria sets.

FIG. 7, as previously described, is a process flow diagram of a method 250 of sharing network data, such as CDN data, between the mobile communication device 10 and the additional mobile communication device 110 based on the table 230 of priority indexes in FIG. 6. At block 252 in the illustrated embodiment, the mobile communication device 10 transitions from a zone having Wi-Fi or cellular network coverage to a no-coverage zone. Thus, the mobile communication device 10 is unable to download updated network data (e.g., CDN data) corresponding to another network, such as a satellite or non-terrestrial network, via Wi-Fi or cellular network connections.

At block 254, the processor 12 of the mobile communication device 10 receives an indication or selection of one or more options associated with network data sharing, including an option to share and receive CDN data automatically, an option to manually trigger searching for CDN data, and/or an option to input an indication of an emergency situation. In some embodiments, the option to manually trigger searching for CDN data automatically triggers an emergency situation. That is, the option to manually trigger searching for CDN data may correspond to entering an input to the mobile communication device 10 indicative of an emergency situation. As described above and in more detail below, selection of the various available options may affect a rate at which the mobile communication device 10 transmits beacon signals indicating a CDN data sharing request for updated CDN data.

At block 256, the processor 12 of the mobile communication device 10 determines if the age of the CDN data stored on the mobile communication device 10 is between zero days and five days old. If the CDN data stored on the mobile communication device 10 is between zero and five days old, regardless of the battery health (e.g., state of charge percentage) and user inputs, the processor 12 determines that the zero priority index 236 corresponding to the zero criteria set 237 from FIG. 6 applies, which corresponds to transmitting a beacon signal once every 240 minutes. If the processor 12 determines that the age of the CDN data is not between zero days and five days old, the method 250 continues to block 260.

At block 260, the processor 12 of the mobile communication device 10 determines if the battery heath (e.g., state of charge percentage) is low (e.g., below the minimum battery health threshold), no emergency input has been entered (or a non-emergency input has been entered), and the age of the CDN data is between 0 days and 10 days. In other words, the mobile communication device 10 determines if the first criteria set 241 and corresponding first priority index 240 from FIG. 6 apply. If so, the method 250 continues to block 262, where the processor 12 transmits, via the transmitter 52, beacon signals indicating a CDN data sharing request for updated CDN data once every 60 minutes. Otherwise, the method 250 continues to block 264.

At block 264, the processor 12 of the mobile communication device 10 determines if an input indicative of an emergency situation has been entered and the age of the CDN data stored on the mobile communication device 10 is between five days and 15 days, regardless of the battery health (e.g., state of charge percentage). In other words, the processor 12 determines if the second criteria set 243 and corresponding second priority index 242 from FIG. 6 apply. If so, the method 250 continues to block 266, where the processor 12 transmits, via the transmitter 52, beacon signals indicating a CDN data sharing request for updated CDN data once every 20 minutes. Otherwise, the method 250 continues to block 268.

At block 268, the processor 12 of the mobile communication device 10 determines if the CDN data stored on the mobile communication device 10 is expired, regardless of battery health (e.g., state of charge percentage) and regardless of any inputs entered by the user to the mobile communication device 10. In other words, the mobile communication device 10 determines if the third criteria set 245 and corresponding third priority index 244 from FIG. 6 applies. If so, the method 250 continues to block 270, where the processor 12 transmits, via the transmitter 52, beacon signals indicating a CDN data sharing request for updated CDN data once every 3 minutes. Otherwise, the method 250 continues to block 272.

At block 272, the processor 12 of the mobile communication device 10 determines that the default criteria set 239 and corresponding default priority index 238 from FIG. 6 applies (e.g., after having excluded all other criteria sets and priority indexes). The method 250 then continues to block 274, where the processor 12 transmits, via the transmitter 52, beacon signals indicating a CDN data sharing request for updated CDN data once every 120 minutes. Block 276 in the illustrated method 250 denotes sending of the beacon signals indicating a CDN data sharing request for CDN data at the rate determined by the processor 12 of the mobile communication device 10 at block 258, 262, 266, 270, or 274.

Figure 8:
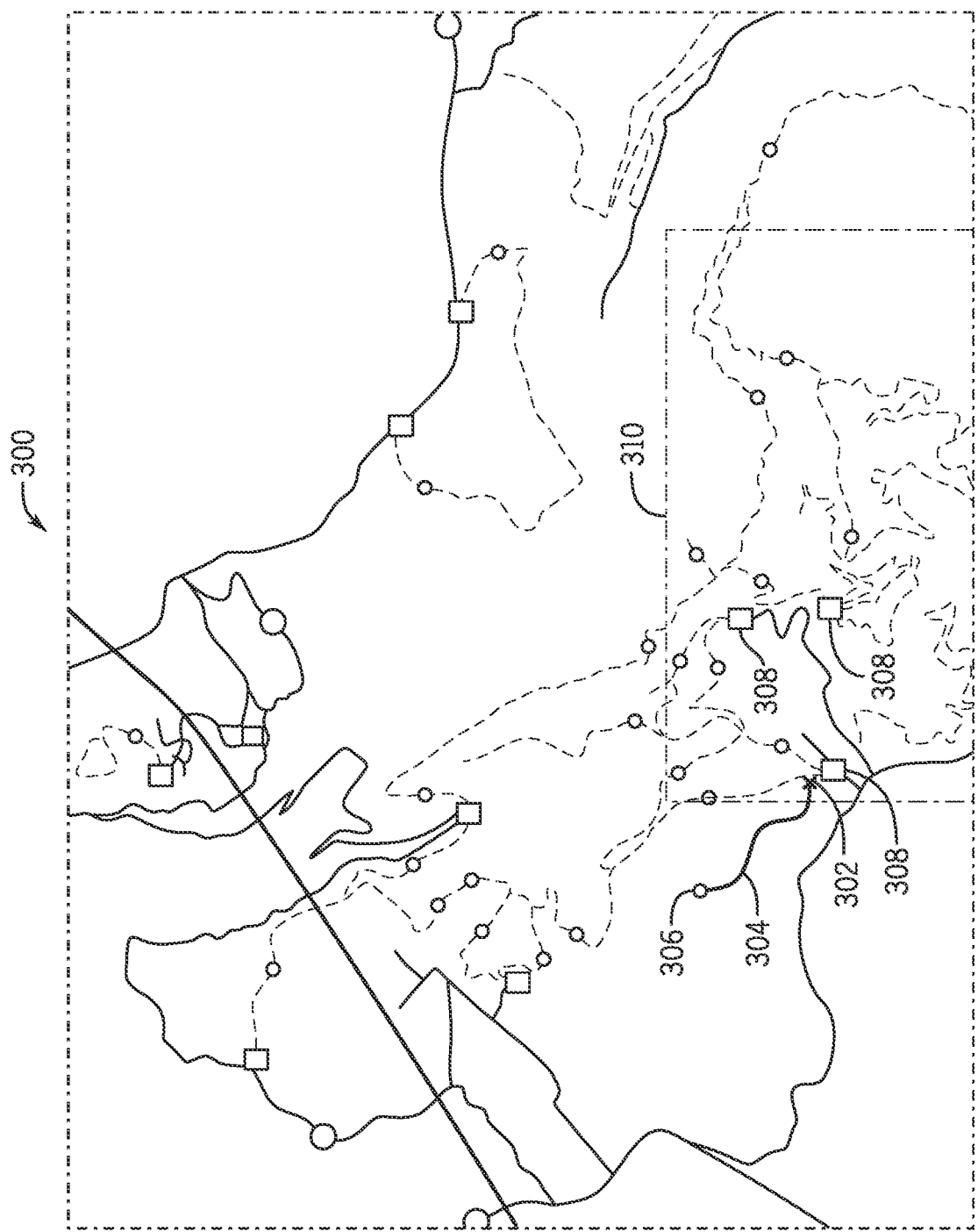
FIG. 8 is a diagram of a map presented on a display of the electronic device of FIG. 1 and utilized by a user of the electronic device to reach sufficient proximity with an additional electronic device for sharing network data, according to embodiments of the present disclosure.

As previously described, the present disclosure is directed toward network data sharing (e.g., CDN data sharing) between mobile communication devices 10, 110 over a P2P network. The P2P network connection is contingent on a proximity between the mobile communication devices 10, 110. Accordingly, the mobile communication device 10 requesting updated network data is equipped with componentry that facilitates display of a map on a display of the mobile communication device 10, where the map may enable the user to move the mobile communication device 10 to an area having a relatively high density of other mobile communication devices 110 capable of sharing network data with the mobile communication device. FIG. 8 is a diagram of a map 300 presented on the display 18 of the electronic device 10 (referred to below as the mobile communication device 10) of FIG. 1.

In some embodiments, the mobile communication device 10 presents the map 300 in an offline mode that does not require network connection for enabling the user to locate areas expected to have a relatively high density of other mobile communication devices 110. For example, a starting location 302 of the mobile communication device 10 may be marked on the map 300 while the mobile communication device 10 has access to one or more networks. Subsequently, the mobile communication device 10 may lose network access. Movement 304 of the mobile communication device 10 from the starting location 302 may be tracked by features (e.g., sensors, such as accelerometers, gyroscopes, gyrometers, and the like) on the mobile communication device 10 that do not require network connection to operate. A current location 306 of the mobile communication device 10 may also be denoted on the map 300.

Further, landmark indications 308 (e.g., trail head indications) disposed in a boundary indication 310 (e.g., park boundary indication) may be included on the map 300 and signify to the user of the mobile communication device 10 areas that are likely to include a relatively high or higher than current density of other mobile communication devices 110. A user of the mobile communication device 10 may utilize the map 300 (including the denoted starting location 302, the denoted movement 304, the denoted current location 306, the landmark indications 308 within the boundary indication 310, and other map features) to move to areas expected to have a relatively high or higher than current density of additional mobile communication devices 110. In this way, a user may increase a likelihood of the mobile communication device 10 coming into a close enough proximity with one or more of the additional communication devices 110 to enable data sharing via a P2P network between the mobile communication device 10 and the additional mobile communication device(s) 110.

In some embodiments, the map 300 does not illustrate the starting location 302 of the mobile communication device 10, the movement 304 of the mobile communication device 10 from the starting location 302, and/or the current location 306 of the mobile communication device 10. However, the map 300 may still enable the user of the mobile communication device 10 to recognize (e.g., in person) landmarks identified via the landmark indications 308 on the map 300.

Embodiments of the present disclosure are directed to mobile communication devices that transmit and receive network data, such as CDN data utilized to access a satellite or non-terrestrial network, over a P2P network. For example, a first mobile communication device may transmit a beacon signal indicating a CDN data sharing request for CDN data to a second mobile communication device when the first mobile communication device is without access to Wi-Fi and cellular networks and, thus, unable to download updated CDN data via the Wi-Fi and cellular networks. Technical effects associated with the embodiments of the present disclosure include improved ability to connect to a network, such as a satellite network, associated with the CDN data, in particular when the first mobile communication device is without access to Wi-Fi and cellular networks.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mobile communication device, comprising:
a transmitter;
a memory configured to store first Content Delivery Network (CDN) data; and
processing circuitry communicatively coupled to the memory and the transmitter and configured to cause the transmitter to transmit a plurality of beacon signals at a rate that changes with a depletion of a state-of-charge (SOC) of a battery of the mobile communication device, increases with an age of the first CDN data, and increases based on an input indicative of an emergency situation, the plurality of beacon signals comprising a beacon signal indicating a CDN data sharing request for second CDN data over a peer-to-peer (P2P) network.

2. The mobile communication device of claim 1, wherein the processing circuitry is configured to cause the transmitter to transmit, over the P2P network, the plurality of beacon signals when the mobile communication device is without access to a wireless service different than the P2P network.

3. The mobile communication device of claim 1, wherein the processing circuitry is configured to cause the transmitter to transmit, over the P2P network, the plurality of beacon signals when a first origination date of the first CDN data is older than a threshold amount of time.

4. The mobile communication device of claim 1, wherein the first CDN data comprises information related to position and movement of mobile base stations.

5. A mobile communication device, comprising:
a display;
a transceiver;
a memory configured to store Content Delivery Network (CDN) data; and
processing circuitry communicatively coupled to the memory, the display, and the transceiver, wherein the processing circuitry is configured to
receive, from an additional mobile communication device, via the transceiver, and over a peer-to-peer (P2P) network, a beacon signal indicating a CDN data sharing request for the CDN data,
present, on the display, an option to share the CDN data,
receive an input indicative of a selection of the option to share the CDN data, and
cause the transceiver to transmit, over the P2P network and based on the input, the CDN data to the additional mobile communication device.

6. The mobile communication device of claim 5, wherein the processing circuitry is configured to cause the transceiver to transmit, over the P2P network, based on the input, and based on the CDN data having an origination date earlier than an additional origination date of additional CDN data stored to additional memory of the additional mobile communication device, the CDN data to the additional mobile communication device.

7. The mobile communication device of claim 5, wherein the processing circuitry is configured to present, on the display, the option to share the CDN data before receiving the beacon signal.

8. The mobile communication device of claim 5, wherein the processing circuitry is configured to present, on the display, the option to share the CDN data based on receiving the beacon signal.

9. The mobile communication device of claim 5, wherein the CDN data comprises information related to position of mobile base stations, movement of mobile base stations, or a combination thereof.

10. A mobile communication device, comprising:
a transceiver;
a memory configured to store Content Delivery Network (CDN) data; and
processing circuitry communicatively coupled to the memory and the transceiver and configured to cause the transceiver to
receive, from an additional mobile communication device and over a peer-to-peer (P2P) network, a beacon signal indicating a CDN data sharing request for the CDN data and a first origination date of additional CDN data stored on the additional mobile communication device, and
transmit, over the P2P network, the CDN data to the additional mobile communication device when the first origination date is older than a second origination date of the CDN data.

11. The mobile communication device of claim 10, wherein the CDN data comprises information related to position of mobile base stations, movement of mobile base stations, or a combination thereof.

12. The mobile communication device of claim 10, wherein the processing circuitry is configured to cause the transceiver to establish a communicative coupling with the additional mobile communication device via the P2P network based on a proximity between the mobile communication device and the additional mobile communication device.

13. The mobile communication device of claim 10, wherein the processing circuitry is configured to cause the transceiver to transmit an additional beacon signal indicating an additional CDN data sharing request for third CDN data over the P2P network.

14. The mobile communication device of claim 13, wherein the processing circuitry is configured to cause the transceiver to receive the third CDN data from a third mobile communication device over the P2P network.

* * * * *